(12) United States Patent
Liu et al.

(10) Patent No.: US 11,773,960 B2
(45) Date of Patent: Oct. 3, 2023

(54) LINEAR TRANSMISSION DEVICE WITH CAPABILITY OF REAL-TIME MONITORING OF AMOUNT OF LUBRICANT

(71) Applicant: HIWIN TECHNOLOGIES CORP., Taichung (TW)

(72) Inventors: Wei-Lun Liu, Taichung (TW); Yu-Hsin Lin, Taichung (TW); Chi-Lun Cheng, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 144 days.

(21) Appl. No.: 17/515,540

(22) Filed: Oct. 31, 2021

(65) Prior Publication Data
US 2023/0135223 A1     May 4, 2023

(51) Int. Cl.
| | | |
|---|---|---|
| *F16H 57/04* | (2010.01) | |
| *G01K 13/00* | (2021.01) | |
| *F16N 29/04* | (2006.01) | |
| *G06F 17/11* | (2006.01) | |
| *G08B 21/18* | (2006.01) | |
| *G01F 23/80* | (2022.01) | |

(Continued)

(52) U.S. Cl.
CPC ..... *F16H 57/0449* (2013.01); *F16H 57/0497* (2013.01); *F16N 29/04* (2013.01); *G01F 23/802* (2022.01); *G01K 13/00* (2013.01); *G06F 17/11* (2013.01); *G08B 21/182* (2013.01); *F16H 25/2214* (2013.01); *F16H 57/041* (2013.01); *F16H 57/042* (2013.01); *F16N 19/00* (2013.01); *F16N 2200/10* (2013.01); *F16N 2210/12* (2013.01); *F16N 2250/08* (2013.01); *F16N 2250/18* (2013.01); *F16N 2260/04* (2013.01)

(58) Field of Classification Search
CPC ............ F16H 57/0449; F16H 57/0497; F16H 25/2214; F16H 57/041; F16H 57/042; G01F 23/802; G01K 13/00; G06F 17/11; G08B 21/182; F16N 29/04; F16N 19/00; F16N 2200/10; F16N 2210/12; F16N 2250/08; F16N 2250/18; F16N 2260/04
USPC ....................................................... 340/618
See application file for complete search history.

(56) References Cited

U.S. PATENT DOCUMENTS

| | | | | |
|---|---|---|---|---|
| 5,282,386 A | * | 2/1994 | Niemczyk | F16H 57/0447 340/459 |
| 6,617,968 B1 | * | 9/2003 | Odisho | G01F 23/263 340/439 |

(Continued)

*Primary Examiner* — Zhen Y Wu
(74) *Attorney, Agent, or Firm* — Winston Hsu (57) ABSTRACT

A linear transmission device with capability of real-time monitoring of an amount of a lubricant includes a long shaft, a moving part, a lubricating device and a detecting module. The lubricating device includes a shell and an oil containing unit. The shell is formed with a first accommodating space. The oil containing unit is disposed in the first accommodating space and configured to provide the lubricant to an outer surface of the long shaft. The detecting module includes a temperature sensing unit and a control unit. The temperature sensing unit is configured to detect a current temperature of the oil containing unit. The control unit is connected with the temperature sensing unit and configured to: receive the current temperature; calculate a remaining amount of the lubricant of the oil containing unit based on the current temperature and an oil releasing model; and output the remaining amount.

16 Claims, 11 Drawing Sheets

(51) Int. Cl.
    *F16H 25/22*    (2006.01)
    *F16N 19/00*    (2006.01)

(56) References Cited

U.S. PATENT DOCUMENTS

| | | | |
|---|---|---|---|
| 8,340,928 B2* | 12/2012 | Sun | G01N 33/2888 |
| | | | 324/698 |
| 9,404,403 B2* | 8/2016 | McDonald | F01M 11/12 |
| 11,192,660 B2* | 12/2021 | Mallette | F01D 25/20 |
| 2008/0078620 A1* | 4/2008 | Yanohara | B23Q 11/14 |
| | | | 184/6.14 |
| 2008/0110700 A1* | 5/2008 | Yanohara | F16C 33/6674 |
| | | | 184/7.4 |
| 2012/0037457 A1* | 2/2012 | Huang | F16H 57/0405 |
| | | | 184/7.4 |
| 2014/0318236 A1* | 10/2014 | Lingle | G01F 23/26 |
| | | | 73/290 R |
| 2015/0226638 A1* | 8/2015 | Chu | F16N 29/00 |
| | | | 702/34 |
| 2016/0054287 A1* | 2/2016 | O'Donnell | G01N 33/2888 |
| | | | 702/25 |
| 2017/0307066 A1* | 10/2017 | Chu | F16N 29/00 |
| 2018/0087420 A1* | 3/2018 | Poster | F16H 57/0449 |
| 2019/0056061 A1* | 2/2019 | Henneberg | G01N 33/2888 |
| 2019/0154200 A1* | 5/2019 | Glasser | F16N 11/00 |
| 2019/0186690 A1* | 6/2019 | Berkebile | F03D 15/00 |
| 2020/0116302 A1* | 4/2020 | Glass | F16N 11/00 |
| 2020/0347928 A1* | 11/2020 | Bauer | F03D 15/00 |
| 2021/0102664 A1* | 4/2021 | Wawrzola | F16N 11/08 |
| 2021/0382431 A1* | 12/2021 | Kashiwakura | G03G 21/0094 |

* cited by examiner

LINEAR TRANSMISSION DEVICE WITH CAPABILITY OF REAL-TIME MONITORING OF AMOUNT OF LUBRICANT

BACKGROUND OF THE INVENTION

1. Field of the Invention

The present disclosure relates to a linear transmission device, and more particularly, to a linear transmission device with capability of real-time monitoring of an amount of a lubricant.

2. Description of the Prior Art

Linear transmission devices, such as ball screws or linear guideways, are widely applied in various machines that require precise movement due to their excellent mechanical transmission efficiency. However, elements of the linear transmission devices need sufficient lubrication, or the service life of the linear transmission devices tends to be shortened due to the wear caused by the frictions between the elements.

Taiwan patent with Pat. No. I359237 discloses a lubricant sensor apparatus for a ball screw, wherein a nut is externally connected with two wires. The two wires constitute a circuit to conduct electricity. The two wires bring contact resistance through the nut, balls and a screw. When the grease on the balls uses up, the circuit to conduct electricity will be able to form an open circuit so as to activate an alarm device, which reminds the user to pour or replace lubricant. However, the peripheral apparatus of the aforementioned patent is more complicated, and the detection mechanism thereof tends to be affected by working environment, such as cutting fluid and chips, and is not accurate.

US patent with U.S. Pat. No. 6,216,821 B1 discloses a lubricating apparatus for a ball screw, wherein a polymer member containing a lubricant is capable of slidably contacting with an outer diameter portion of a screw shaft, which can prevent the lubricant attached to thread grooves of the screw shaft from being scraped off, such that the lubricant can be efficiently maintained in the thread grooves of the screw shaft. However, the aforementioned patent lacks a detecting and feedback mechanism for the remaining amount of the lubricant. When the remaining amount of the lubricant is insufficient or the lubricant is about to exhaust, users cannot know immediately, which is unfavorable for maintenance.

As the applied industries of the linear transmission devices, such as semiconductor or automation industries, have entered or are moving towards the field of unmanned factories, how to effectively monitor the amount of the lubricant of the linear transmission devices in an unmanned environment and arrange the maintenance timely to avoid the service life of the linear transmission devices being shortened due to insufficient lubrication has become the goal of relevant industries.

SUMMARY OF THE INVENTION

According to an embodiment of the present disclosure, a linear transmission device with capability of real-time monitoring of an amount of a lubricant includes a long shaft, a moving part, a lubricating device and a detecting module. The moving part is movably disposed on the long shaft along an axial direction of the long shaft. The lubricating device includes a shell and an oil containing unit. The shell is fixed on one end of the moving part and formed with a first accommodating space. The oil containing unit is disposed in the first accommodating space and configured to provide the lubricant to an outer surface of the long shaft. The detecting module includes a temperature sensing unit and a control unit. The temperature sensing unit is disposed on the shell and adjacent to the oil containing unit. The temperature sensing unit is configured to detect a current temperature of the oil containing unit. The control unit is connected with the temperature sensing unit. The control unit is configured to: receive the current temperature; calculate a remaining amount of the lubricant of the oil containing unit based on the current temperature and an oil releasing model; and output the remaining amount.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part thereof, and in which is shown by way of illustration specific embodiments in which the disclosure may be practiced. In this regard, directional terminology, such as top, bottom, left, right, front or back, is used with reference to the orientation of the Figure (s) being described. The components of the present disclosure can be positioned in a number of different orientations. As such, the directional terminology is used for purposes of illustration and is in no way limiting. In addition, identical components or similar numeral references are used for identical components or similar components in the following embodiments. Accordingly, the drawings and descriptions will be regarded as illustrative in nature and not as restrictive.

Figure 1:
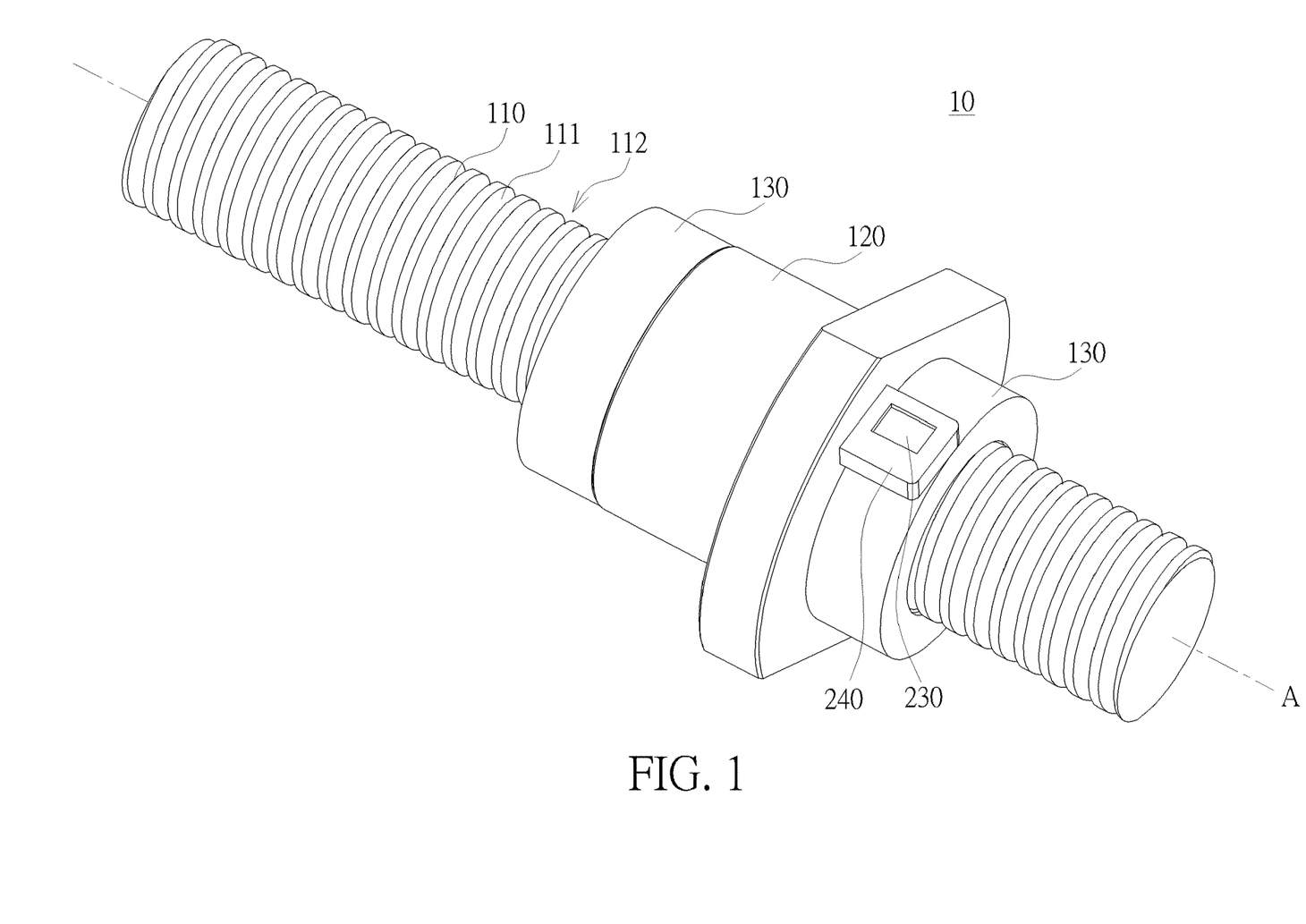
FIG. 1 is a three-dimensional diagram showing a linear transmission device according to one embodiment of the present disclosure.
Figure 2:
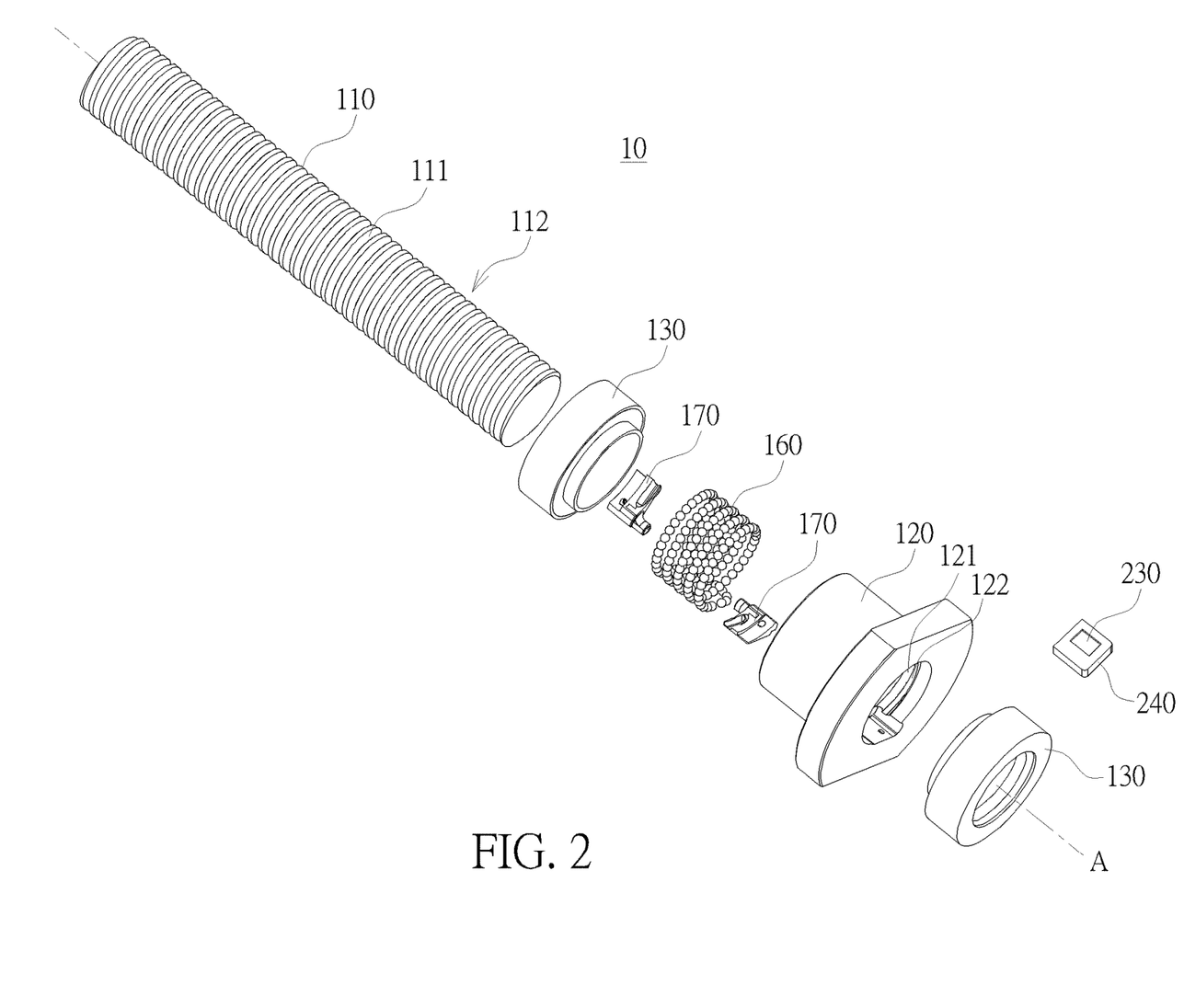
FIG. 2 is an exploded diagram showing the linear transmission device of FIG. 1.
Figure 3:
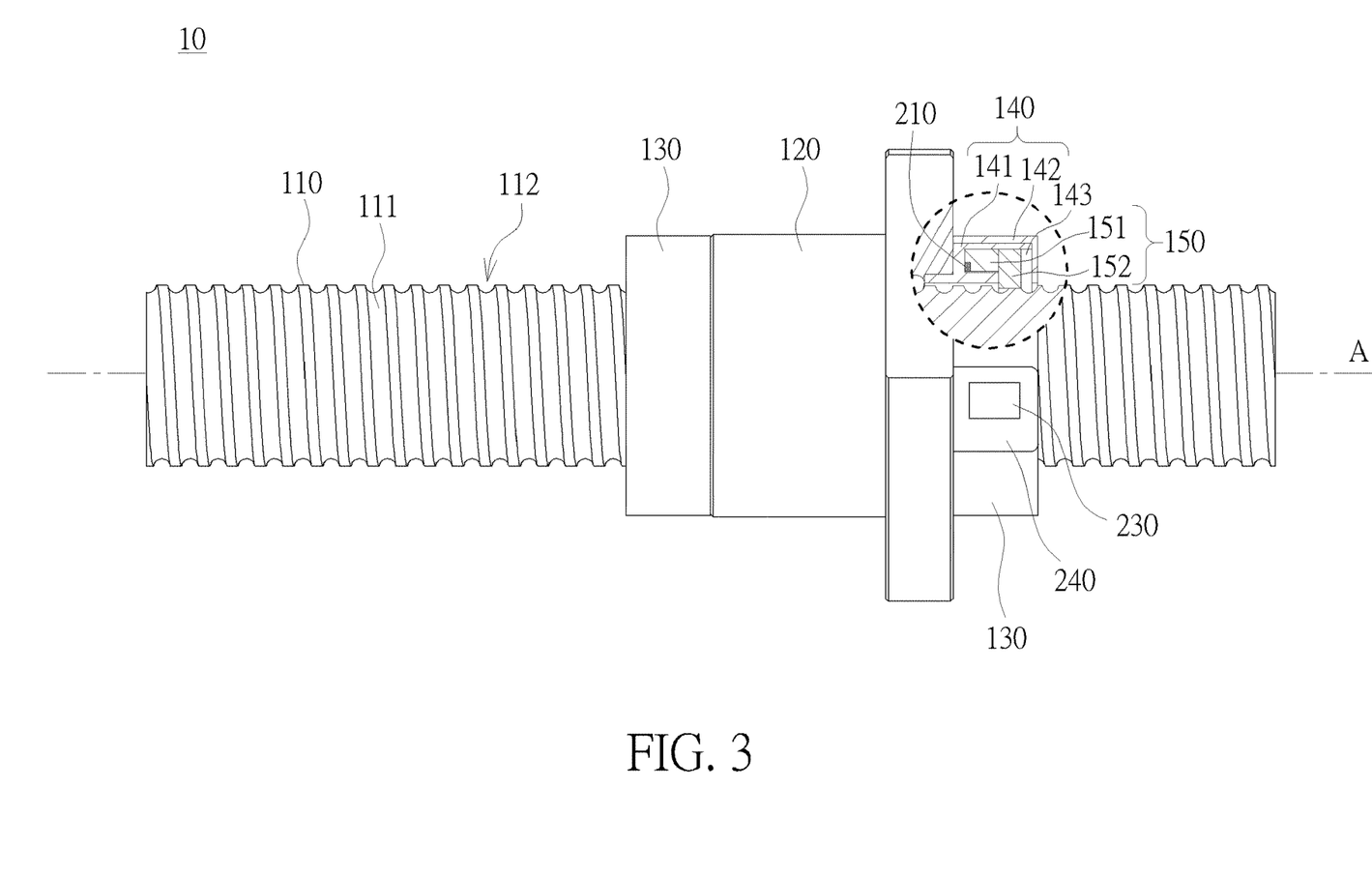
FIG. 3 is a partial cross-sectional view of the linear transmission device of FIG. 1.
Figure 4:
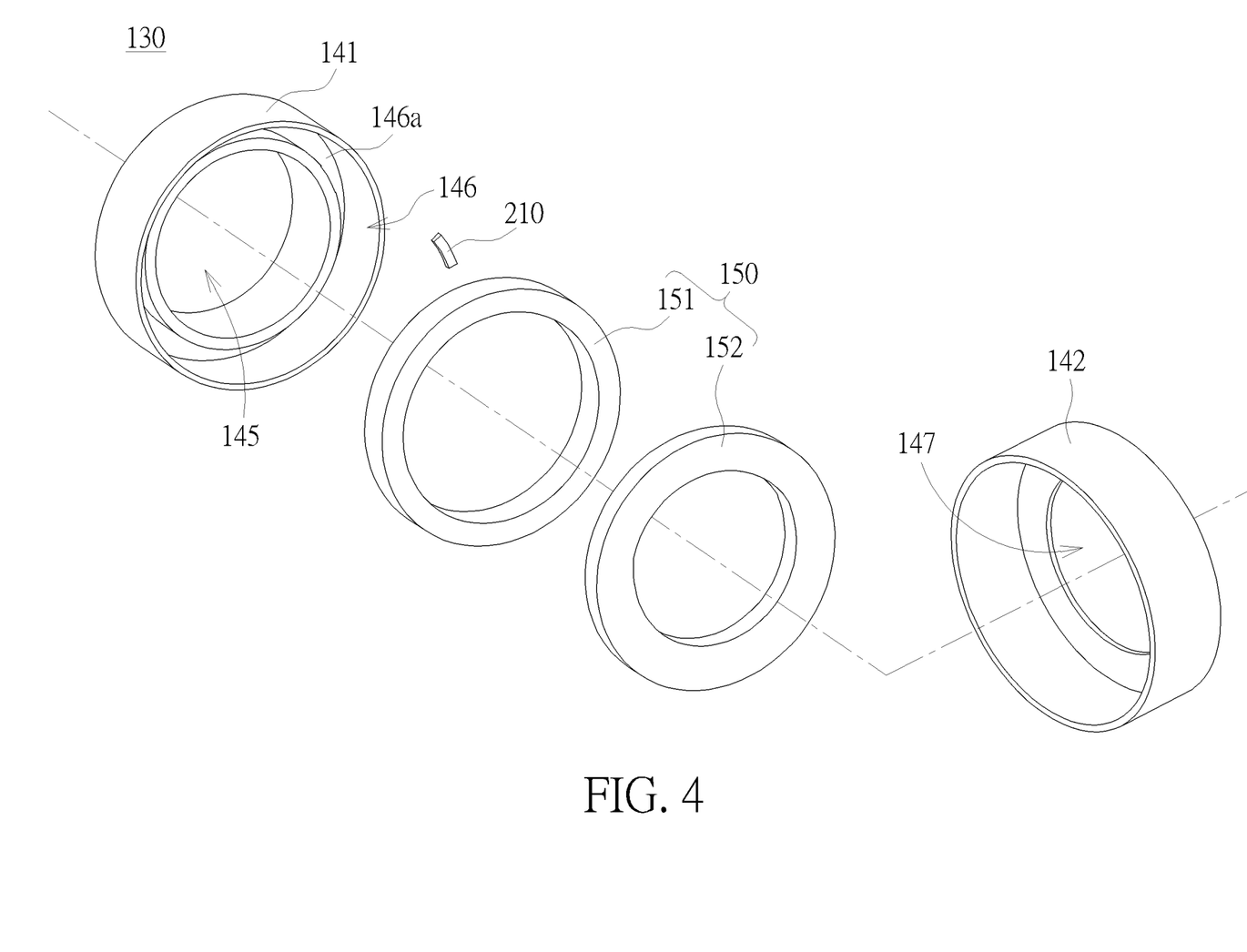
FIG. 4 is an exploded diagram showing a lubricating device of FIG. 1.
Figure 5:
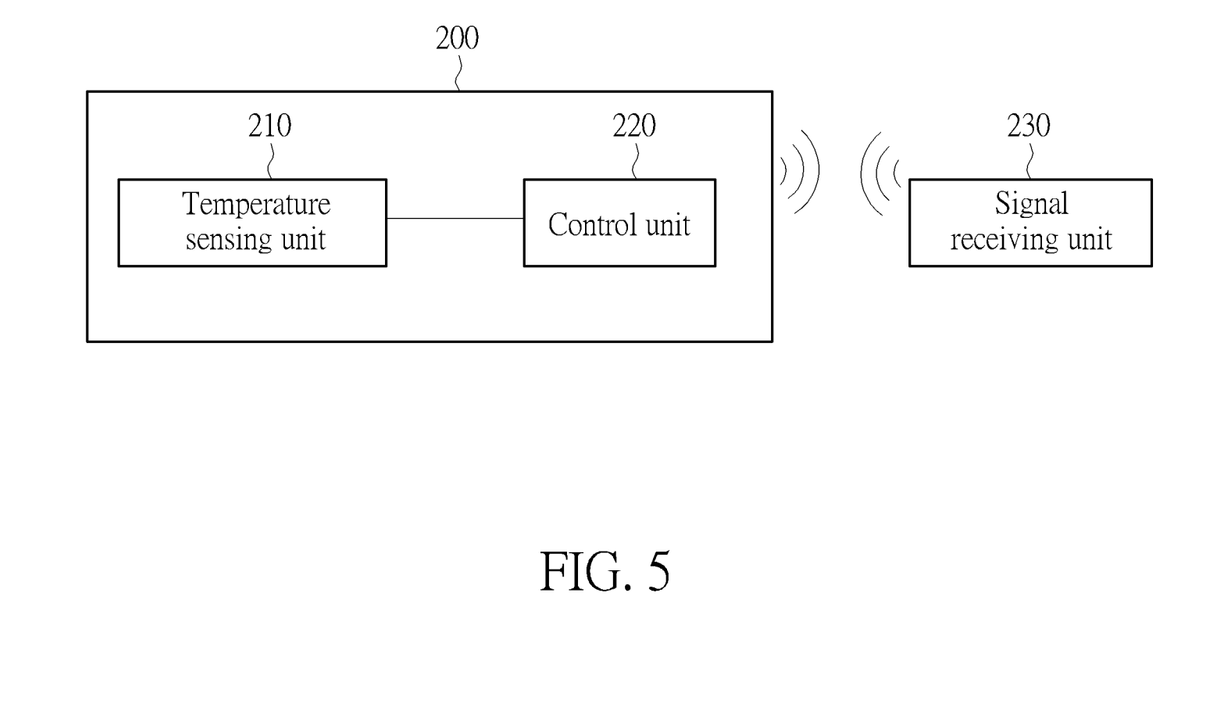
FIG. 5 is a functional block diagram of a detecting module and a signal receiving unit according to one embodiment of the present disclosure.

Please refer to FIG. 1 to FIG. 5. FIG. 1 is a three-dimensional diagram showing a linear transmission device 10 according to one embodiment of the present disclosure. FIG. 2 is an exploded diagram showing the linear transmission device 10 of FIG. 1. FIG. 3 is a partial cross-sectional view of the linear transmission device 10 of FIG. 1. FIG. 4 is an exploded diagram showing a lubricating device 130 of FIG. 1. FIG. 5 is a functional block diagram of a detecting module 200 and a signal receiving unit 230 according to one embodiment of the present disclosure. The linear transmission device 10 includes a long shaft 110, a moving part 120, two lubricating devices 130 and a detecting module 200. The linear transmission device 10 can selectively include a plurality of balls 160, two circulating elements 170 and an electronic device 240.

As shown in FIG. 1 and FIG. 2, in the embodiment, the linear transmission device 10 is a ball screw, the long shaft 110 is a screw shaft, and the moving part 120 is a nut. An outer surface 111 of the long shaft 110 is formed with a plurality of outer thread grooves 112. The moving part 120 is movably disposed on the long shaft 110 along an axial direction A of the long shaft 110. An inner surface 121 of the moving part 120 is formed with a plurality of inner thread grooves 122. The inner thread grooves 122 and the outer thread grooves 112 together form a load path to cooperate with the circulating elements 170, such that the balls 160 can circulate in the load path and the circulating elements 170. In other embodiment, the linear transmission device 10 can be, but is not limited to, a linear guideway or a ball spline. For example, when the linear transmission device 10 is the linear guideway, the long shaft 110 can be a sliding rail, and the moving part 120 can be a sliding block; when the linear transmission device 10 is the ball spline, the long shaft 110 can be a spline shaft, and the moving part 120 can be a spline nut.

As shown in FIG. 3 and FIG. 4, the two lubricating devices 130 are fixedly disposed on two ends of the moving part 120, respectively. Each of the lubricating devices 130 includes a shell 140 and an oil containing unit 150. The shell 140 is fixed on one end of the moving part 120 and formed with a first accommodating space 143. In the embodiment, the shell 140 includes a first shell 141 and a second shell 142. The first shell 141 is formed with a first through hole 145 and an annular groove 146. The first through hole 145 is inserted by the long shaft 110. The annular groove 146 surrounds the first through hole 145. The second shell 142 is assembled with the first shell 141, such that the first accommodating space 143 is formed between the first shell 141 and the second shell 142. The second shell 142 is formed with a second through hole 147 to be inserted by the long shaft 110.

The oil containing unit 150 is disposed in the first accommodating space 143 and configured to provide the lubricant to the outer surface 111 of the long shaft 110. In the embodiment, the oil containing unit 150 includes a solid lubricating material 151 and a guiding part 152. The solid lubricating material 151 can include the lubricant and a carrier (such as polymer, synthetic resin, teflon or paraffin wax) to carry the lubricant. The guiding part 152 can be made of a material capable of absorbing the lubricant, such as sponge or wool felt. The solid lubricating material 151 is disposed in the annular groove 146. The guiding part 152 is adjacent to the solid lubricating material 151 and closes the annular groove 146. The lubricant released from the solid lubricating material 151 is transferred to the outer surface 111 of the long shaft 110 through the guiding part 152. In the embodiment, the guiding part 152 also functions as an oil seal.

As shown in FIG. 3, FIG. 4 and FIG. 5, the detecting module 200 includes temperature sensing units 210 and a control unit 220. Each of the temperature sensing units 210 is disposed on the shell 140 and adjacent to the oil containing unit 150. The temperature sensing unit 210 is configured to detect a current temperature of the oil containing unit 150. In the embodiment, a number of the temperature sensing units 210 is two, which is corresponding to a number of the lubricating devices 130. The two temperature sensing units 210 are disposed in the shells 140 of the two lubricating devices 130, respectively. The two temperature sensing units 210 are configured to detect the current temperatures of the two oil containing units 150. That is, the linear transmission device 10 according to the present disclosure can separately monitor remaining amounts of the lubricant of multiple oil containing units 150. The aforementioned "each of the temperature sensing units 210 is disposed on the shell 140 and adjacent to the oil containing unit 150" refers that each of the temperature sensing units 210 can be disposed on an outer surface the shell 140, on an inner surface the shell 140 or in the first accommodating space 143 (that is, the temperature sensing unit 210 can be fixed on other elements instead of being fixed on the shell 140, and the position where the temperature sensing unit 210 disposed is close to the oil containing unit 150. When the position where the temperature sensing unit 210 disposed is closer to the oil containing unit 150, the temperature detected by the temperature sensing unit 210 is closer to the actual temperature of the oil containing unit 150. In the embodiment, each of the temperature sensing units 210 is disposed in the first accommodating space 143 and is disposed on the solid lubricating material 151. Specifically, the temperature sensing unit 210 is disposed between the groove bottom 146a of the annular groove 146 and the solid lubricating material 151, one surface of the temperature sensing unit 210 faces the groove bottom 146a, and another surface of the temperature sensing unit 210 faces the solid lubricating material 151.

As shown in FIG. 5, the control unit 220 is connected with the temperature sensing unit 210. The control unit 220 can be connected with the temperature sensing unit 210 in a wired manner or wireless manner. The control unit 220 has capability of calculation. The control unit 220 can be, but is not limited to, a central processing unit (CPU) or an electronic device including a CPU, such as a computer or a mobile phone. Please also refer to FIG. 1. In the embodiment, the linear transmission device 10 includes an electronic device 240. The electronic device 240 is disposed on the shell 140 of the lubricating device 130. The control unit 220 is disposed inside the electronic device 240. The electronic device 240 can further include a signal receiving unit 230. In the embodiment, the signal receiving unit 230 is a display screen. The signal receiving unit 230 is connected with the control unit 220. The signal receiving unit 230 can be connected with the control unit 220 in a wired manner or wireless manner. The signal receiving unit 230 is configured to receive and display the signal transmitted from the control unit 220, such as the remaining amount of the lubricant or a warning signal. As such, the worker located around the linear transmission device 10 can monitor the amount of the lubricant of the linear transmission device 10 by the signal displayed by the signal receiving unit 230. In other embodiment, the control unit 220 and the signal receiving unit 230 can be remote devices. The control unit 220 and the signal receiving unit 230 can be integrated in a same electronic device, can be disposed in different electronic devices, or can be independent electronic devices. For example, the linear transmission device 10 can be disposed in a machine located in a factory, the control unit 220 and the signal receiving unit 230 can be integrated in a computer located in the office, such that the worker can remotely monitor the linear transmission device 10 in the office. Alternatively, the control unit 220 can be a computer located in the office, and the signal receiving unit 230 can be a mobile phone of the worker, such that the worker can remotely monitor the amount of the lubricant of the linear transmission device 10 at different locations.

Figure 6:
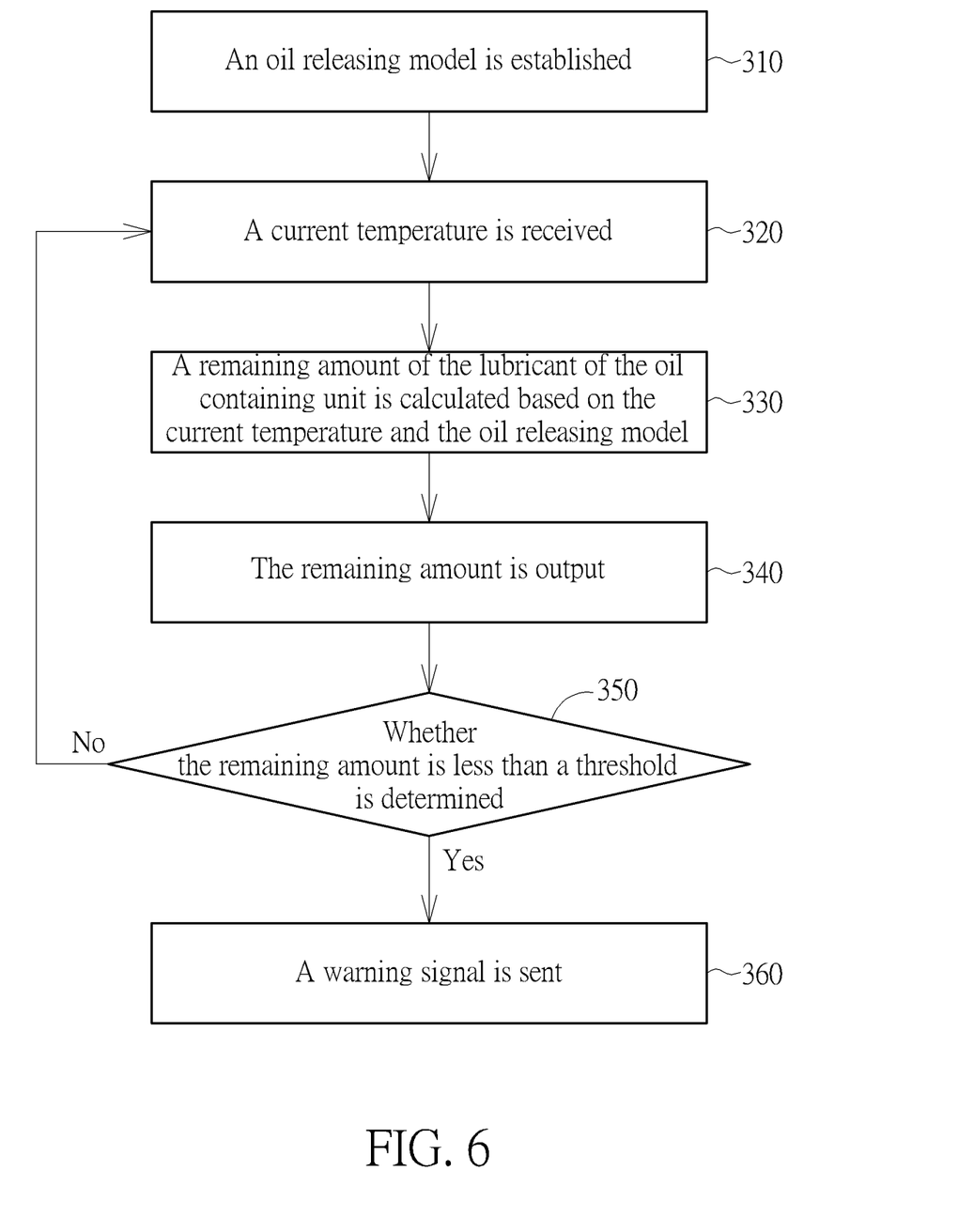
FIG. 6 is a flow chart of a control unit monitoring an amount of a lubricant.

FIG. 6 is a flow chart of the control unit 220 monitoring the amount of the lubricant. The control unit 220 is configured to perform Step 310 to Step 340, and selectively perform Step 350 and Step 360. In Step 310, an oil releasing model is established. In Step 320, a current temperature is received. In Step 330, a remaining amount of the lubricant of the oil containing unit 150 is calculated based on the current temperature and the oil releasing model. In Step 340, the remaining amount is output. In Step 350, whether the remaining amount is less than a threshold is determined. In Step 360, a warning signal is sent.

Regarding Step 310, since the solid lubricating material 151 has different oil releasing rates at different temperatures, through Step 310, the temperatures and the oil releasing rates of the solid lubricating material 151 can be collected to establish the oil releasing model thereof. In addition, the solid lubricating materials 151 of different material/model/viscosity have different oil releasing rates at the same temperature. Through Step 310, the oil releasing models can be established for the solid lubricating materials 151 of different material/model/viscosity. The following will explain how to collect the temperatures and the oil releasing rates of a same solid lubricating material 151 to establish the oil releasing model thereof.

Figure 7:
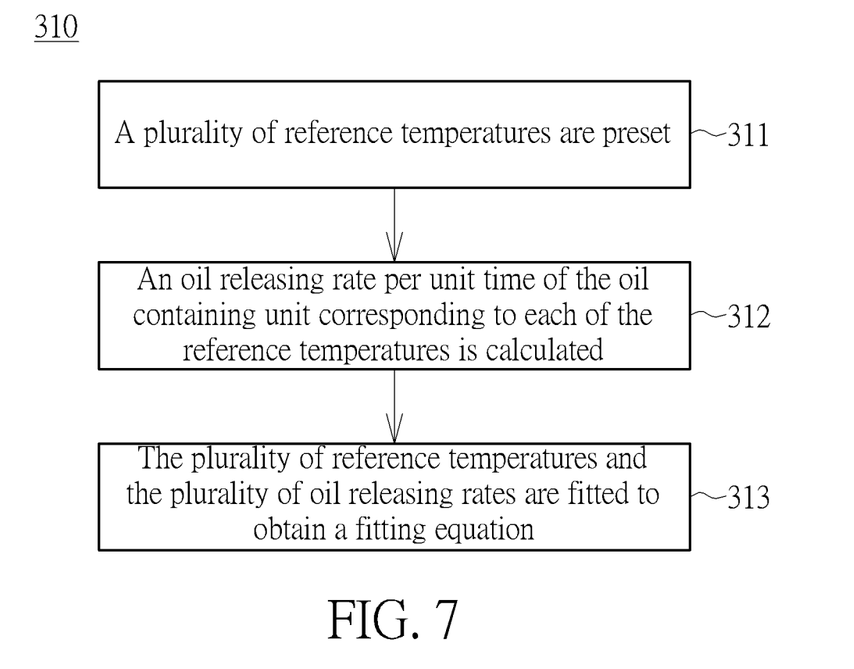
FIG. 7 is a flow chart of establishing an oil releasing model according to one embodiment of the present disclosure.

FIG. 7 is a flow chart of establishing an oil releasing model according to one embodiment of the present disclosure, which includes Step 311 and Step 312, and can selectively include Step 313. In Step 311, a plurality of reference temperatures are preset, wherein the plurality of reference temperatures are different from one another. In Step 312, an oil releasing rate per unit time of the oil containing unit 150 corresponding to each of the reference temperatures is calculated, so as to obtain a plurality of oil releasing rates. In Step 313, the plurality of reference temperatures and the plurality of oil releasing rates are fitted to obtain a fitting equation.

In Step 311, the plurality of reference temperatures can be selected according to the operating temperature range of the linear transmission device 10 and the desired accuracy. For example, when the operating temperature range of the linear transmission device 10 is 30° C. to 70° C., the temperatures with 20° C. interval therebetween within the operating temperature range can be selected as the plurality of reference temperatures, i.e., the temperatures of 30° C., 50° C. and 70° C. can be selected as the plurality of reference temperatures. For another example, the temperatures with 10° C. interval therebetween within the operating temperature range can be selected as the plurality of reference temperatures, i.e., the temperatures of 30° C., 40° C., 50° C., 60° C. and 70° C. can be selected as the plurality of reference temperatures. When the temperature interval between the reference temperatures is smaller, the accuracy is higher. According to one embodiment, the temperature interval between the reference temperatures is 10° C.

Figure 8:
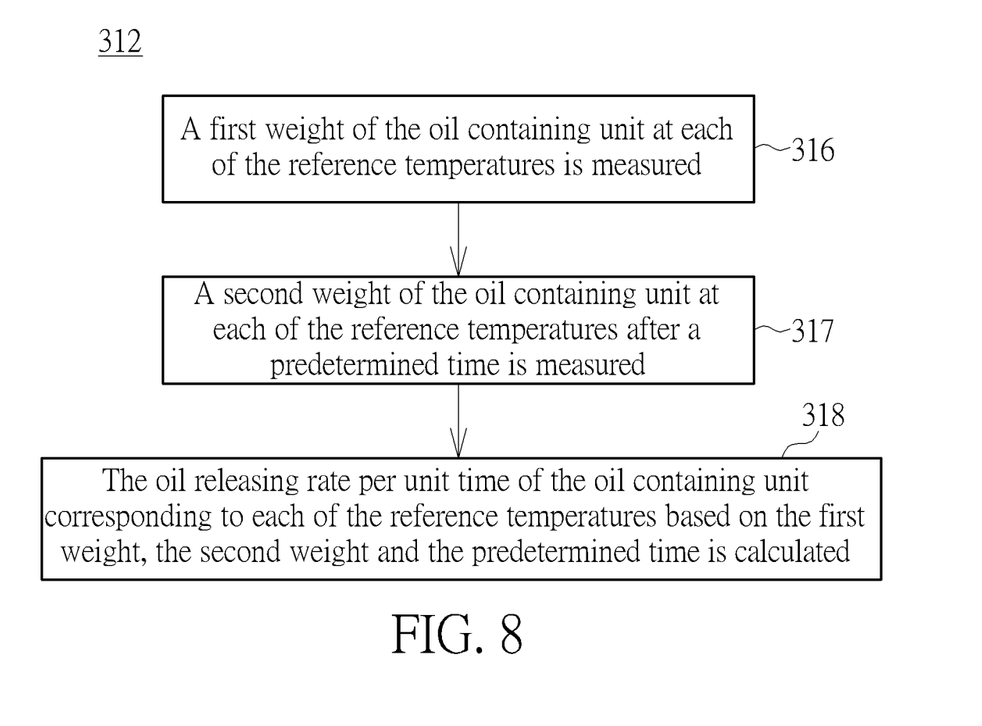
FIG. 8 is a flow chart of calculating an oil releasing rate per unit time of an oil containing unit corresponding to each of reference temperatures according to one embodiment of the present disclosure.

Regarding Step 312, please refer to FIG. 8, which is a flow chart of calculating the oil releasing rate per unit time of the oil containing unit 150 corresponding to each of the reference temperatures according to one embodiment of the present disclosure, and includes Step 316 to Step 318. In Step 316, a first weight of the oil containing unit 150 at each of the reference temperatures is measured. In Step 317, a second weight of the oil containing unit at each of the reference temperatures after a predetermined time is measured. In Step 318, the oil releasing rate per unit time of the oil containing unit 150 corresponding to each of the reference temperatures based on the first weight, the second weight and the predetermined time is calculated. For example, in Step 316, the first weight of the oil containing unit 150 at 30° C. is Wi gram (g). In Step 317, the second weight of the oil containing unit 150 at 30° C. after one hour (i.e., 60 minutes) is Wf g. In Step 318, the oil releasing rate per minute (min) of the oil containing unit 150 corresponding to 30° C. is (Wf−Wi)/60, the unit of the oil releasing rate per minute is g/min. When the oil containing unit 150 includes the solid lubricating material 151 and the guiding part 152, the lubricant is provided by the solid lubricating material 151, and the guiding part 152 does not consume. Therefore, the oil releasing rate per unit time of the oil containing unit 150 corresponding to each of the reference temperatures can be regarded as the oil releasing rate per unit time of the solid lubricating material 151 corresponding to each of the reference temperatures. According to the foregoing calculation method, it can be seen that the "the oil releasing rate" in the present disclosure refers to the oil releasing rate per unit time, which can also be referred to as the oil releasing rate for the sake of conciseness. Through Step 312, the oil releasing rate per unit time of the oil containing unit 150 corresponding to each of the reference temperatures can be obtained. That is, a database of the reference temperatures and the oil releasing rates of the oil containing unit 150 can be established.

In Step 313, the data obtained in Step 312 is processed to obtain the fitting equation. The fitting equation can be obtained based on polynomial, least square method, regression analysis, etc. In addition, the fitting equation can be calculated by available calculation software such as Excel.

In other words, the oil releasing model according to the present disclosure can be the database of the reference temperatures and the oil releasing rates obtained in Step 312 or the fitting equation obtained by fitting the data of the database. The oil releasing model can be used as the basis for estimating the remaining amount of the lubricant of the oil containing unit 150.

Refer back to FIG. 6. In Step 330, the remaining amount of the lubricant can be calculated as follows. Assuming that the remaining amount of the lubricant is W2, the initial weight of the lubricant is W1, the oil releasing rate of the reference temperature t is $R_t$, and the oil releasing time is T, the releasing amount M of the lubricant can be obtained by Formula (I), and the remaining amount of the lubricant W2 can be obtained by Formula (II):

$$M = R_t \times T \qquad \text{(I)};$$

$$W2 = (W1 - M) \qquad \text{(II)};$$

wherein the unit of each of W1, W2 and M can be a weight unit such as gram (g), the unit of $R_t$ can be weight unit/time unit such as g/min; the unit of T can be a time unit such as minute (min).

Hereinafter, Step 320 and Step 330 will be illustrated by practical examples. Please refer to Table 1, which is an oil releasing model of the linear transmission device 10 shown in FIG. 1 to FIG. 4 and is obtained by Step 311 and Step 312, wherein the viscosity of the solid lubricating material 151 is 68 cst. Herein, the oil releasing model is a database of the reference temperatures and the oil releasing rates.

TABLE 1

| reference temperature (° C.) | 30 | 40 | 50 | 60 | 70 |
|---|---|---|---|---|---|
| oil releasing rate (g/min) | $1.1736 \times 10^{-4}$ | $3.0141 \times 10^{-4}$ | $7.2847 \times 10^{-4}$ | $1.4115 \times 10^{-3}$ | $2.2556 \times 10^{-3}$ |

Assume that the detection frequency in FIG. 6 is 1 time/min. That is, the control unit 220 performs Step 320 once every minute. When the current temperature of Step 320 is 40° C., the oil releasing rate $R_{40}$ is $3.0141 \times 10^{-4}$ g/min according to Table 1. The time interval between two detections is regarded as the oil releasing time. Herein, the oil releasing time is 1 min. According to Formula (I) and Formula (II), the oil releasing amount M and the remaining amount W2 of the lubricant are as follows: $M=3.0141 \times 10^{-4}$ g/min×1 min, $W2=W1-3.0141 \times 10^{-4}$ g/min×1 min. The initial weight of the lubricant at the most beginning can be measured in advance. For example, the weight of a brand new oil containing unit 150 can be firstly measured, and then the weight of the oil containing unit 150 which has released all the lubricant therein is measured. The difference between the two weights can be regarded as the initial weight of the lubricant at the most beginning (that is, the weight of the lubricant when the linear transmission device 10 operates for 0 minutes). The remaining amount of the lubricant after the linear transmission device 10 operated for 1 minute can be calculated by substituting the initial weight of the lubricant at the most beginning into W1 of Formula (II). When performing the second detection (that is, at the beginning of the second minute after the linear transmission device 10 is operated), the remaining amount of the lubricant after the linear transmission device 10 operated for 1 minute is used as the initial weight of the lubricant in the second detection. Then the releasing amount and the remaining amount of the lubricant at the second minute can be calculated by Formula (I) and Formula (II). As such, the remaining amount of the lubricant after the linear transmission device 10 operated for 2 minutes can be calculated. The remaining amount of the lubricant of the linear transmission device 10 for every additional minute of operation can be calculated in a similar manner.

Assuming that the current temperature received by the control unit 220 lacks corresponding oil releasing rate in the database, the corresponding oil releasing rate can be calculated by interpolation or extrapolation. For example, when the current temperature of Step 320 is 42.5° C., the oil releasing rate $R_{42.5}$ at 42.5° C. can be calculated by interpolation, as shown in Formula (III):

$$\frac{50-40}{7.2847 \times 10^{-4} - 3.0141 \times 10^{-4}} = \frac{42.5-40}{R_{42.5} - 3.0141 \times 10^{-4}}. \quad (III)$$

For another example, when the current temperature of Step 320 is 74° C., the oil releasing rate $R_{74}$ at 74° C. can be calculated by extrapolation, as shown in Formula (IV):

$$\frac{70-60}{2.2556 \times 10^{-3} - 1.4115 \times 10^{-3}} = \frac{74-70}{R_{74} - 2.2556 \times 10^{-3}}. \quad (IV)$$

After the oil releasing rate is calculated, the remaining amount of lubricating oil can be calculated by Formula (I) and Formula (II).

Figure 9:
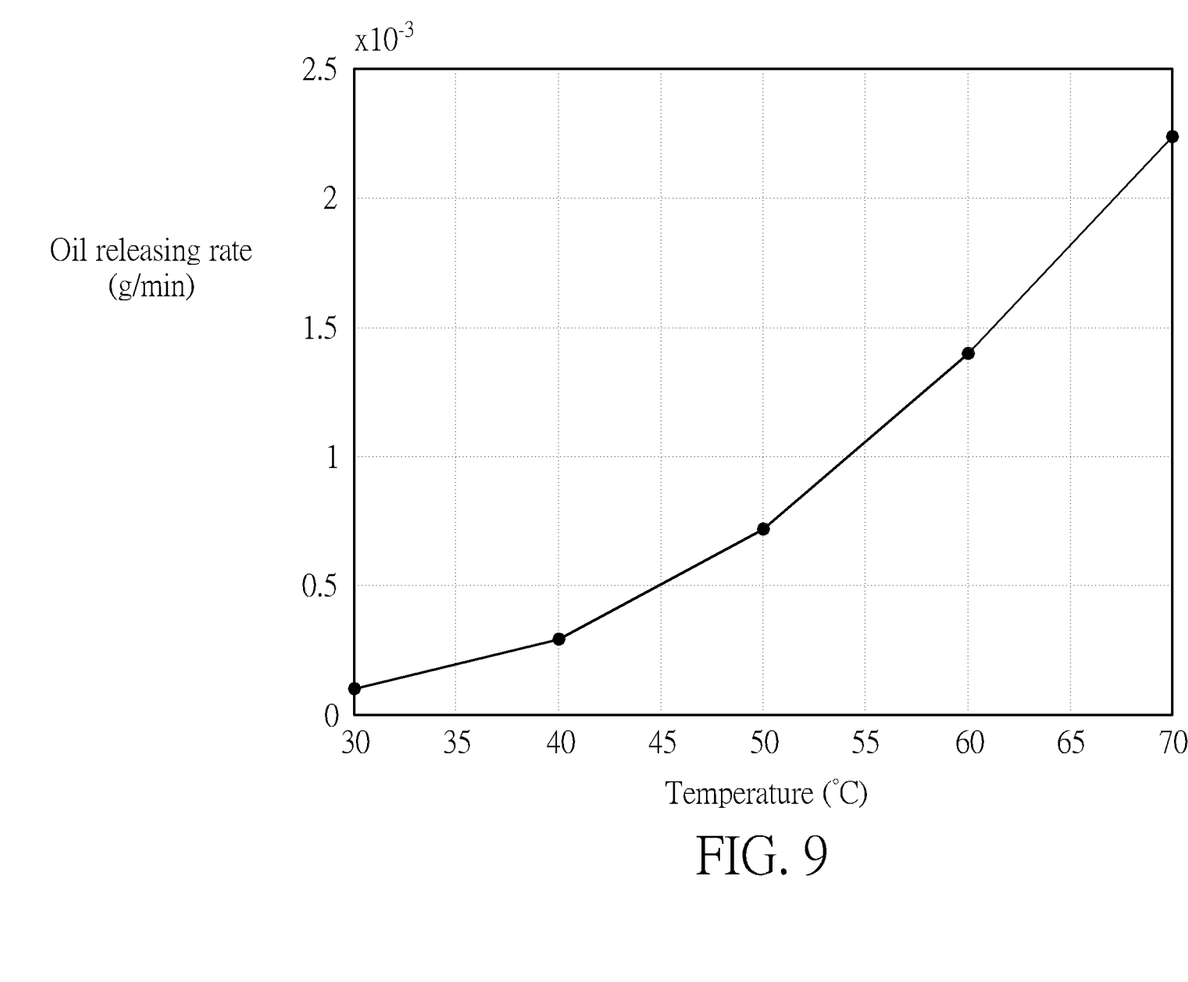
FIG. 9 is a diagram showing a relationship between the reference temperatures and the oil releasing rates.

Please refer to FIG. 9, which is a diagram showing a relationship between the reference temperatures and the oil releasing rates, which is obtained by plotting the data in Table 1. The curve in FIG. 9 is determined to be approximate to a quadratic polynomial by observation, and the fitting equation of Formula (V) can be obtained according to Step 313. First, assuming that $y=ax^2+bx+cy$, the temperature of 30° C., 50° C. and 70° C. are substituted into x of the equation, respectively:

$$\begin{cases} 1.1736 \times 10^{-4} = 30^2 a + 30b + c \\ 7.2847 \times 10^{-4} = 50^2 a + 50b + c \\ 2.2556 \times 10^{-3} = 70^2 a + 70b + c \end{cases}$$

The following fitting equation can be obtained by solving a, b and c:

$$y=1.1451 \times 10^{-6} x^2 - 6.1049 \times 10^{-5} x + 9.1827 \times 10^{-4} \quad (V).$$

In Formula (V), y represents the oil releasing rate, and x represents temperature (the reference temperature/the current temperature). By substituting the current temperature of Step 320 into x of Formula (V), the oil releasing rate corresponding to the current temperature of Step 320 can be obtained. Afterward, the remaining amount of the lubricant can be obtained by Formula (I) and Formula (II) based on the oil releasing rate. According to one embodiment of the present disclosure, the oil releasing rate calculated by the fitting equation of Formula (V) is 1.502%, the actual oil releasing rate is 1.15%, and the difference therebetween is 0.352%, which shows that the present disclosure can accurately estimate the oil releasing rate. Accordingly, the remaining amount of the lubricant can be accurately estimated, and the amount of the lubricant of the linear transmission device 10 can be effectively monitored.

Refer back to FIG. 6. In Step 340, the remaining amount is output. That is, the control unit 220 sends the remaining amount to the signal receiving unit 230. In Step 350, whether the remaining amount is less than the threshold is determined. The threshold is preset. For example, the threshold can be 0 grams or 10% of the initial weight of the lubricant at the most beginning. When the remaining amount is less than the threshold, it means that the lubricant is exhausted or is about to be exhausted. At this time, Step 360 is performed, wherein the control unit 220 sends the warning signal. The warning signal can be a sound signal and/or a light signal, In this case, the signal receiving unit 230 may be equipped with a sound module and/or a light module to emit the sound signal and/or the light signal. When the remaining amount is greater than or equal to the threshold, it means that the lubricant is sufficient. At this time, Step 320 is performed to continue the detection. Steps 350 and 360 are selective steps. In other embodiments, when Steps 350 and 360 are not included, Step 320 is performed after Step 340 is performed. In addition, the oil releasing model can be established in advance. Once the oil releasing model is established, the subsequent detection can be started directly from Step 320.

According to the above description, the linear transmission device 10 according to the present disclosure has capability of real-time monitoring of the amount of the lubricant. With the oil releasing model and detecting the current temperature of the oil containing unit 150, the remaining amount of the lubricant can be estimated. Therefore, it can know that the lubricant is exhausted or about to be exhausted in real time.

Figure 10:
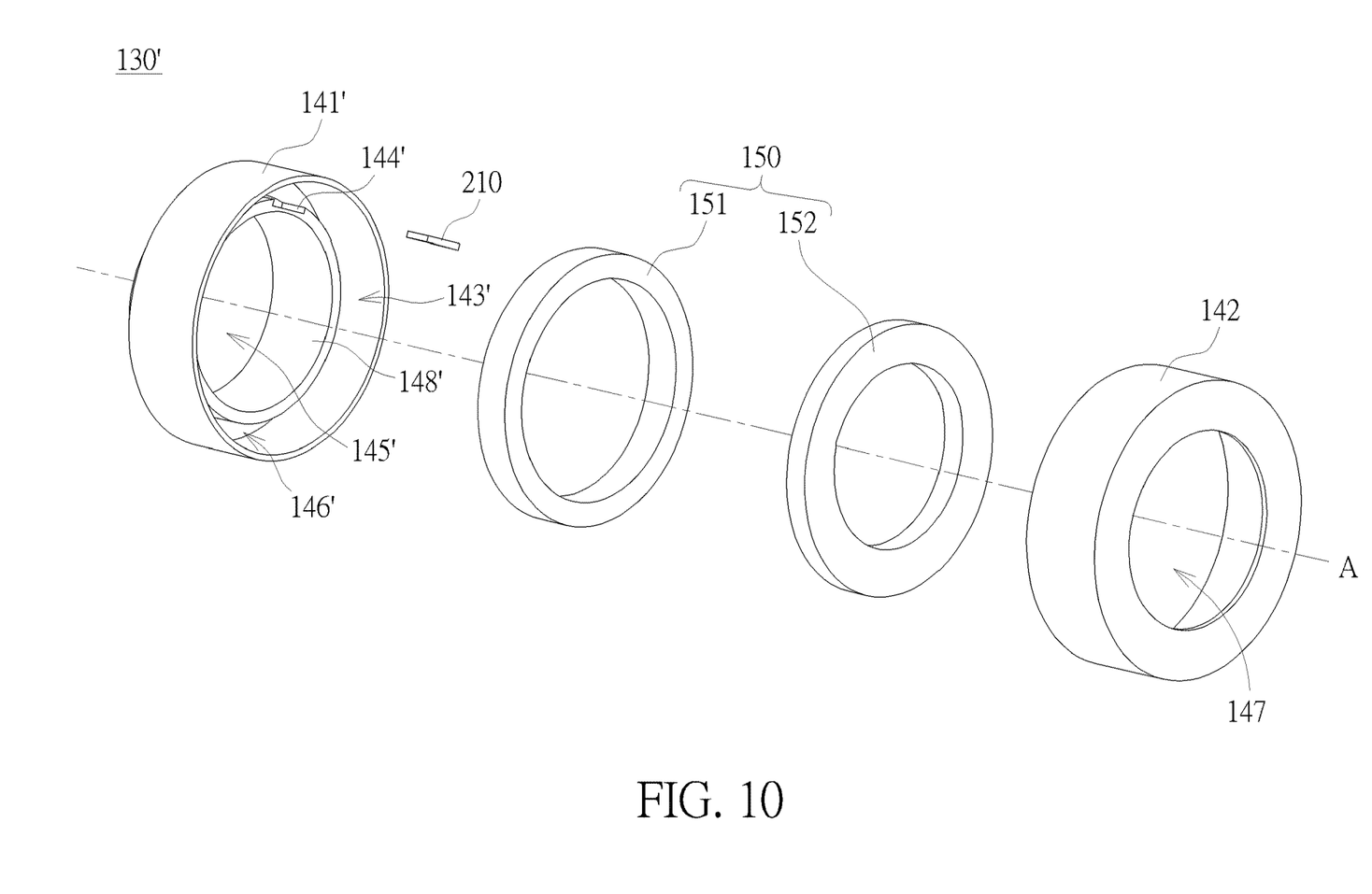
FIG. 10 is an exploded diagram showing a lubricating device according to another embodiment of the present disclosure.

Refer to FIG. 10, which is an exploded diagram showing a lubricating device 130' according to another embodiment of the present disclosure. The first shell 141' is formed with a first through hole 145' and an annular groove 146'. The difference between the lubricating device 130' and the lubricating device 130 is that an inner annular wall 148' is formed with a second accommodating space 144'. The second accommodating space 144' is communicated with a first accommodating space 143'. The temperature sensing unit 210 is disposed in the second accommodating space 144'. One surface of the temperature sensing unit 210 faces the inner annular wall 148', and another surface of the temperature sensing unit 210 faces the solid lubricating material 151. A shape of the second accommodating space 144' can be arranged to cooperate with a shape of the temperature sensing unit 210, such that the temperature sensing unit 210 can be embedded in the second accommodating space 144'. As such, the effect for positioning the temperature sensing unit 210 can be improved. For other details of lubricating device 130', references can be made to the relevant description of the lubricating device 130.

Figure 11:
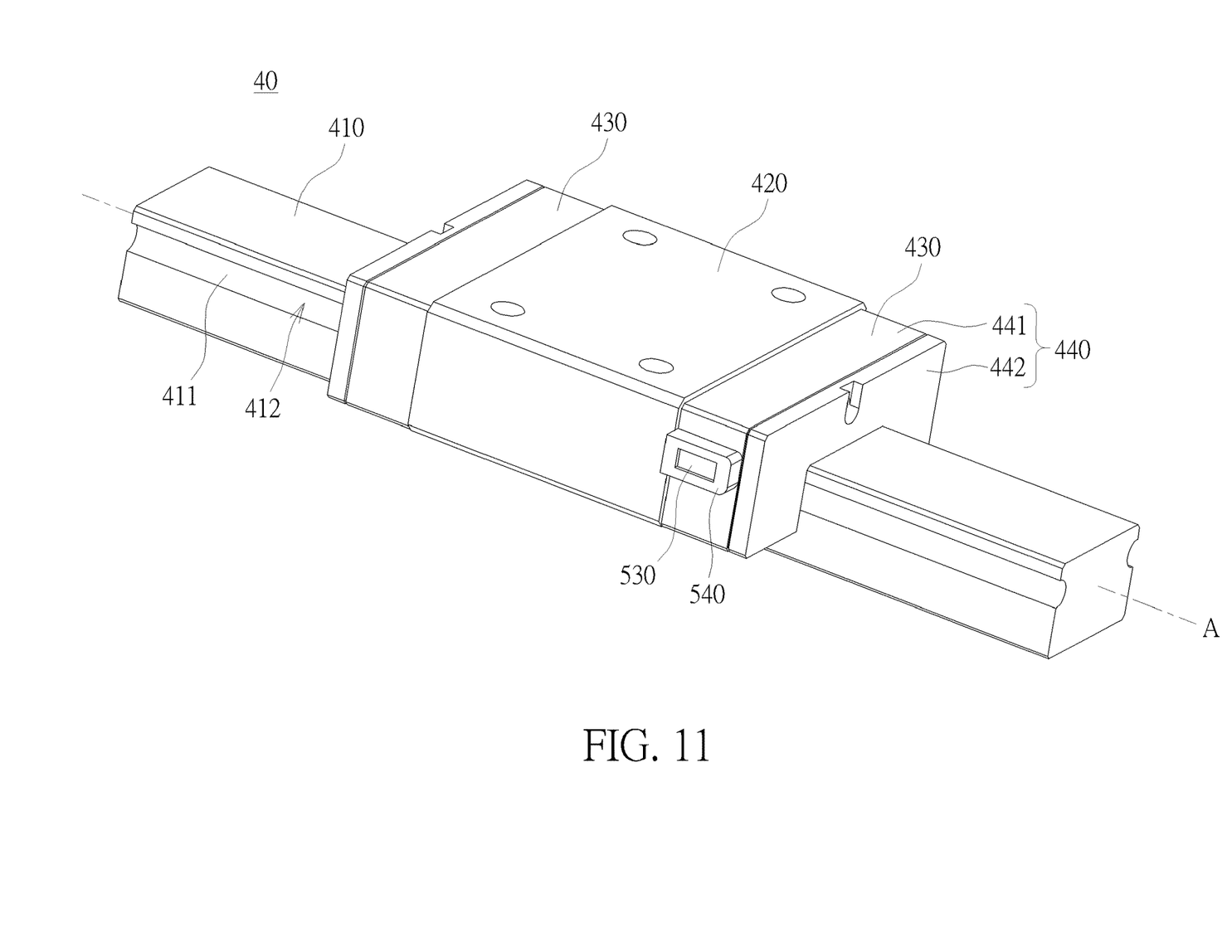
FIG. 11 is a three-dimensional diagram showing a linear transmission device according to another embodiment of the present disclosure.
Figure 12:
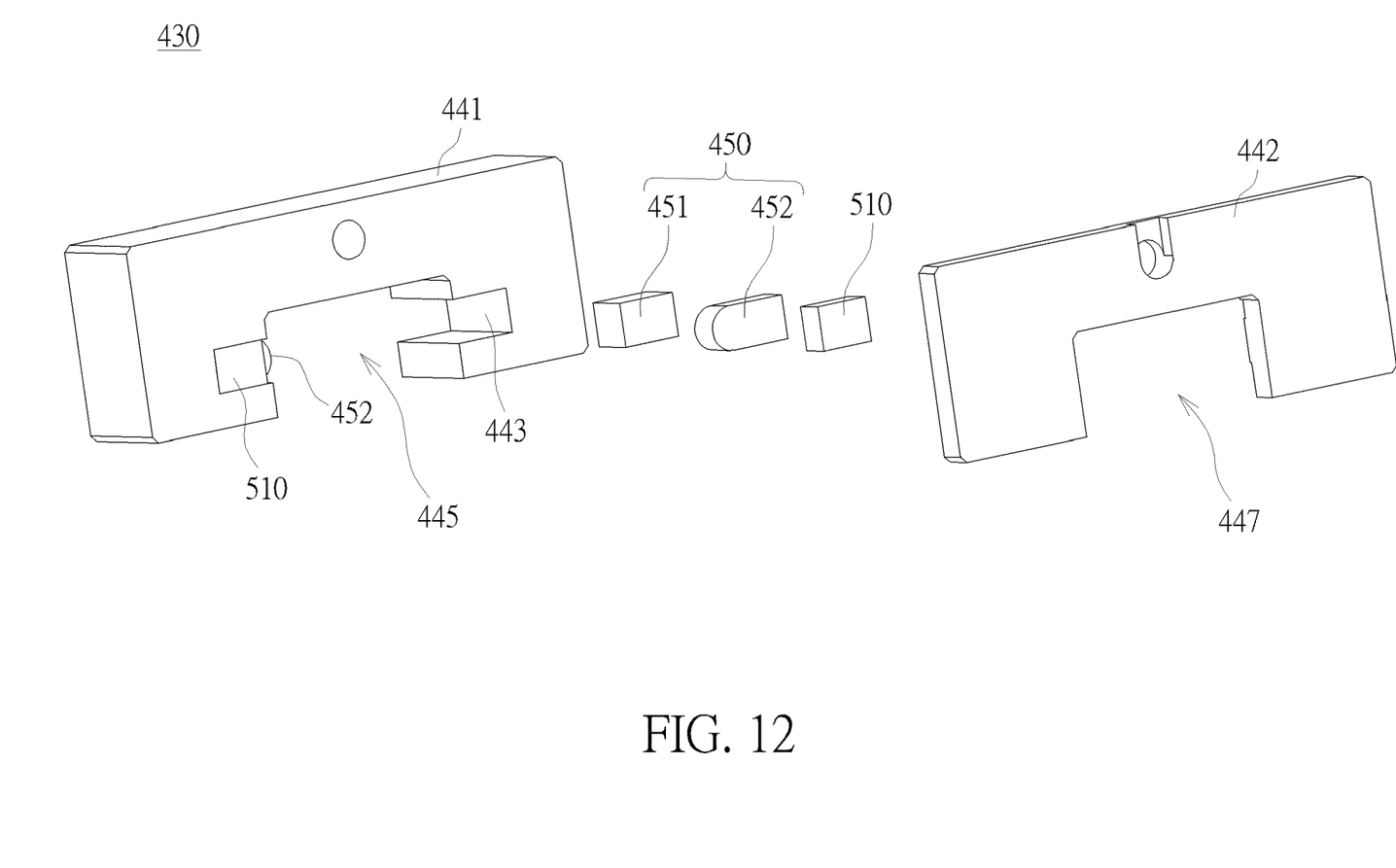
FIG. 12 is an exploded diagram showing a lubricating device of FIG. 11.

Refer to FIG. 11 and FIG. 12. FIG. 11 is a three-dimensional diagram showing a linear transmission device 40 according to another embodiment of the present disclosure. FIG. 12 is an exploded diagram showing a lubricating device 430 of FIG. 11. The linear transmission device 40 includes a long shaft 410, a moving part 420, two lubricating devices 430 and a detecting module (not labelled). The linear transmission device 40 can selectively include an electronic device 540. In the embodiment, the linear transmission device 40 is a linear guideway, the long shaft 410 is a sliding rail, and the moving part 420 is a sliding block. The moving part 420 is movably disposed on the long shaft 410 along an axial direction A of the long shaft 410.

The two lubricating devices 430 are fixedly disposed on two ends of the moving part 420, respectively. Each of the lubricating devices 430 includes a shell 440 and two oil containing units 450. The shell 440 is fixed on one end of the moving part 420. In the embodiment, the shell 440 includes a first shell 441 and a second shell 442. The first shell 441 is an end cap. The second shell 442 is an oil scraper. The first shell 441 is formed with a first groove 445 and two first accommodating spaces 443. The first groove 445 is inserted by the long shaft 410. The two first accommodating spaces 443 are formed on two sides of the first groove 445 and are communicated with the first groove 445. The second shell 442 is assembled with the first shell 441. The second shell 442 is formed with a second groove 447 to be inserted by the long shaft 410.

The oil containing unit 450 is configured to provide the lubricant to an outer surface 411 of the long shaft 410. Each of the oil containing units 450 includes a solid lubricating material 451 and a guiding part 452. The oil containing unit 450 is disposed in the first accommodating space 443. The guiding part 452 is adjacent to the solid lubricating material 451. The guiding part 452 protrudes from the first accommodating space 443 to the first groove 445. A protruding length of the guiding part 452 is corresponding to a concave depth of the rail groove 412, such that the lubricant released from the solid lubricating material 451 can be transferred to the outer surface 411 of the long shaft 410 through the guiding part 452.

The detecting module includes temperature sensing units 510 and a control unit (not shown). Each of the temperature sensing units 510 is disposed on the shell 440 and adjacent to the one of the oil containing units 450. In the embodiment, the number of the temperature sensing units 510 is four. Each of the lubricating devices 430 includes two temperature sensing units 510. The two temperature sensing units 510 are disposed in the two first accommodating spaces 443 of the first shell 441, respectively. The two temperature sensing units 510 are configured to detect the current temperatures of the two oil containing units 450, respectively. The control unit is disposed inside the electronic device 540. The electronic device 540 can further include a signal receiving unit 530. In the embodiment, the signal receiving unit 530 is a display screen.

For other details of the linear transmission device 40, references can be made to the relevant description of the linear transmission device 10.

Comparing to prior art, the linear transmission device of the present disclosure is capable of estimating the remaining amount of the lubricant by temperature. It can know that the lubricant is exhausted or about to be exhausted in real time. Therefore, maintenance can be arranged timely, which is beneficial to prolonging the service life of the linear transmission device, and is beneficial to the application of unmanned factories.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear transmission device with capability of real-time monitoring of an amount of a lubricant, comprising:
   a long shaft;
   a moving part movably disposed on the long shaft along an axial direction of the long shaft;
   a lubricating device, comprising:
      a shell fixed on one end of the moving part and formed with a first accommodating space; and
      an oil containing unit disposed in the first accommodating space and configured to provide the lubricant to an outer surface of the long shaft; and
   a detecting module, comprising:
      a temperature sensing unit disposed on the shell and adjacent to the oil containing unit, the temperature sensing unit being configured to detect a current temperature of the oil containing unit; and a control unit connected with the temperature sensing unit, the control unit being configured to:
  receive the current temperature;
  establish an oil releasing model, comprising:
    presetting a plurality of reference temperatures, wherein the plurality of reference temperatures are different from one another; and
    calculating an oil releasing rate per unit time of the oil containing unit corresponding to each of the reference temperatures, so as to obtain a plurality of oil releasing rates;
  calculate a remaining amount of the lubricant of the oil containing unit based on the current temperature and the oil releasing model; and
  output the remaining amount.

2. The linear transmission device of claim 1, wherein the control unit is further configured to:
  determine whether the remaining amount is less than a threshold, wherein when the remaining amount is less than the threshold, the control unit sends a warning signal.

3. The linear transmission device of claim 1, wherein establishing the oil releasing model further comprises:
  fitting the plurality of reference temperatures and the plurality of oil releasing rates to obtain a fitting equation.

4. The linear transmission device of claim 1, wherein calculating the oil releasing rate per unit time of the oil containing unit corresponding to each of the reference temperatures comprises:
  measuring an first weight of the oil containing unit at each of the reference temperatures;
  measuring a second weight of the oil containing unit at each of the reference temperatures after a predetermined time; and
  calculating the oil releasing rate per unit time of the oil containing unit corresponding to each of the reference temperatures based on the first weight, the second weight and the predetermined time.

5. The linear transmission device of claim 1, wherein the oil containing unit comprises a solid lubricating material and a guiding part, the lubricant released from the solid lubricating material is transferred to the outer surface of the long shaft through the guiding part.

6. The linear transmission device of claim 5, wherein the shell comprises:
  a first shell formed with a first through hole and an annular groove, wherein the first through hole is inserted by the long shaft, and the annular groove surrounds the first through hole; and
  a second shell assembled with the first shell, wherein the second shell is formed with a second through hole to be inserted by the long shaft;
  wherein the solid lubricating material is disposed in the annular groove, and the guiding part is adjacent to the solid lubricating material and closes the annular groove.

7. The linear transmission device of claim 5, wherein the temperature sensing unit is disposed on the solid lubricating material.

8. The linear transmission device of claim 1, wherein the shell is formed with a second accommodating space, the second accommodating space is communicated with the first accommodating space, and the temperature sensing unit is disposed in the second accommodating space.

9. The linear transmission device of claim 1, wherein the temperature sensing unit is disposed on an outer surface of the shell.

10. A linear transmission device with capability of real-time monitoring of an amount of a lubricant, comprising:
  a long shaft;
  a moving part movably disposed on the long shaft along an axial direction of the long shaft;
  a lubricating device, comprising:
    a shell fixed on one end of the moving part and formed with a first accommodating space, the shell comprising:
      a first shell formed with a first through hole and an annular groove, wherein the first through hole is inserted by the long shaft, and the annular groove surrounds the first through hole; and
      a second shell assembled with the first shell, wherein the second shell is formed with a second through hole to be inserted by the long shaft; and
    an oil containing unit disposed in the first accommodating space and configured to provide the lubricant to an outer surface of the long shaft, the oil containing unit comprising a solid lubricating material and a guiding part, the lubricant released from the solid lubricating material being transferred to the outer surface of the long shaft through the guiding part, the solid lubricating material being disposed in the annular groove, and the guiding part being adjacent to the solid lubricating material and closing the annular groove; and
  a detecting module, comprising:
    a temperature sensing unit disposed on the shell and adjacent to the oil containing unit, the temperature sensing unit being configured to detect a current temperature of the oil containing unit; and
    a control unit connected with the temperature sensing unit, the control unit being configured to:
      receive the current temperature;
      calculate a remaining amount of the lubricant of the oil containing unit based on the current temperature and an oil releasing model; and
      output the remaining amount.

11. The linear transmission device of claim 10, wherein the control unit is further configured to:
  determine whether the remaining amount is less than a threshold, wherein when the remaining amount is less than the threshold, the control unit sends a warning signal.

12. The linear transmission device of claim 10, wherein the control unit is further configured to:
  establish the oil releasing model, comprising:
    presetting a plurality of reference temperatures, wherein the plurality of reference temperatures are different from one another; and
    calculating an oil releasing rate per unit time of the oil containing unit corresponding to each of the reference temperatures, so as to obtain a plurality of oil releasing rates;
  wherein establishing the oil releasing model further comprises:
    fitting the plurality of reference temperatures and the plurality of oil releasing rates to obtain a fitting equation.

13. The linear transmission device of claim 10, wherein the control unit is further configured to:
establish the oil releasing model, comprising:
presetting a plurality of reference temperatures, wherein the plurality of reference temperatures are different from one another; and
calculating an oil releasing rate per unit time of the oil containing unit corresponding to each of the reference temperatures, so as to obtain a plurality of oil releasing rates;
wherein calculating the oil releasing rate per unit time of the oil containing unit corresponding to each of the reference temperatures comprises:
measuring an first weight of the oil containing unit at each of the reference temperatures;
measuring a second weight of the oil containing unit at each of the reference temperatures after a predetermined time; and
calculating the oil releasing rate per unit time of the oil containing unit corresponding to each of the reference temperatures based on the first weight, the second weight and the predetermined time.

14. The linear transmission device of claim 10, wherein the temperature sensing unit is disposed on the solid lubricating material.

15. The linear transmission device of claim 10, wherein the shell is formed with a second accommodating space, the second accommodating space is communicated with the first accommodating space, and the temperature sensing unit is disposed in the second accommodating space.

16. The linear transmission device of claim 10, wherein the temperature sensing unit is disposed on an outer surface of the shell.

* * * * *